United States Patent
Su et al.

(10) Patent No.: US 10,440,401 B2
(45) Date of Patent: Oct. 8, 2019

(54) BACKWARD-COMPATIBLE HDR CODECS WITH TEMPORAL SCALABILITY

(71) Applicant: DOLBY LABORATORIES LICENSING CORPORATION, San Francisco, CA (US)

(72) Inventors: Guan-Ming Su, Fremont, CA (US); Qian Chen, San Jose, CA (US); Tao Chen, Palo Alto, CA (US); David Brooks, Mountain View, CA (US); Samir N. Hulyalkar, Los Gatos, CA (US); Peng Yin, Ithaca, NY (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 219 days.

(21) Appl. No.: 15/481,015

(22) Filed: Apr. 6, 2017

(65) Prior Publication Data
US 2017/0295382 A1 Oct. 12, 2017

Related U.S. Application Data

(60) Provisional application No. 62/319,424, filed on Apr. 7, 2016.

(51) Int. Cl.
*H04N 7/18* (2006.01)
*H04N 11/02* (2006.01)
(Continued)

(52) U.S. Cl.
CPC ............ *H04N 19/98* (2014.11); *H04N 19/31* (2014.11); *H04N 19/33* (2014.11); *H04N 19/50* (2014.11); *H04N 19/70* (2014.11)

(58) Field of Classification Search
None
See application file for complete search history.

(56) References Cited

U.S. PATENT DOCUMENTS

| 8,014,445 B2 | 9/2011 | Segall |
|---|---|---|
| 8,780,991 B2 | 7/2014 | Kwon |

(Continued)

FOREIGN PATENT DOCUMENTS

| WO | 2013/033596 | 3/2013 |
|---|---|---|
| WO | 2013/059116 | 4/2013 |

(Continued)

OTHER PUBLICATIONS

Boyce, J. et al "Overview of SHVC: Scalable Extensions of the High Efficiency Video Coding Standard" IEEE Transactions on Circuits and Systems for Video Technology, vol. 26, Issue 1, pp. 20-34, Jul. 29, 2015.

(Continued)

*Primary Examiner* — Talha M Nawaz (57) ABSTRACT

A processor for video coding receives a full-frame rate (FFR) HDR video signal and a corresponding FFR SDR video signal. An encoder generates a scalable bitstream that allows decoders to generate half-frame-rate (HFR) SDR, FFR SDR, HFR HDR, or FFR HDR signals. Given odd and even frames of the input FFR SDR signal, the scalable bitstream combines a base layer of coded even SDR frames with an enhancement layer of coded packed frames, where each packed frame includes a downscaled odd SDR frame, a downscaled even HDR residual frame, and a downscaled odd HDR residual frame. In an alternative implementation, the scalable bitstream combines four signals layers: a base layer of even SDR frames, an enhancement layer of odd SDR frames, a base layer of even HDR residual frames and an enhancement layer of odd HDR residual frames. Corresponding decoder architectures are also presented.

9 Claims, 5 Drawing Sheets

(51) Int. Cl.
*H04N 11/04* (2006.01)
*H04N 19/98* (2014.01)
*H04N 19/50* (2014.01)
*H04N 19/31* (2014.01)
*H04N 19/70* (2014.01)
*H04N 19/33* (2014.01)

(56) References Cited

U.S. PATENT DOCUMENTS

| | | | |
|---|---|---|---|
| 8,798,149 | B2 | 8/2014 | Wu |
| 8,811,490 | B2 | 8/2014 | Su |
| 9,049,445 | B2 | 6/2015 | Chen |
| 9,060,180 | B2 | 6/2015 | Gish |
| 9,066,070 | B2 | 6/2015 | Su |
| 9,219,916 | B2 | 12/2015 | Su |
| 9,264,681 | B2 | 2/2016 | Gish |
| 9,549,207 | B2 | 1/2017 | Su |
| 2007/0201560 | A1* | 8/2007 | Segall ............ H04N 19/61 375/240.24 |
| 2010/0220789 | A1 | 9/2010 | Yuwen |
| 2013/0083838 | A1* | 4/2013 | Touze ............ H04N 5/2355 375/240.01 |
| 2013/0314495 | A1 | 11/2013 | Chen |
| 2014/0010294 | A1 | 1/2014 | Ye |
| 2014/0146891 | A1 | 5/2014 | Chuang |
| 2014/0301457 | A1 | 10/2014 | Pu |
| 2015/0098510 | A1 | 4/2015 | Ye |
| 2015/0326865 | A1 | 11/2015 | Yin |
| 2015/0341675 | A1 | 11/2015 | Su |
| 2015/0358633 | A1 | 12/2015 | Choi |
| 2016/0029044 | A1 | 1/2016 | Konstantinides |

FOREIGN PATENT DOCUMENTS

| | | |
|---|---|---|
| WO | 2014/107255 | 7/2014 |
| WO | 2014/130343 | 8/2014 |

OTHER PUBLICATIONS

Lai, P. et al "Combined Temporal and Inter-Layer Prediction for Scalable Video Coding Using HEVC" IEEE Picture Coding Symposium, Dec. 8-11, 2013, pp. 117-120.

Gao, Y. et al "I-1.264/Advanced Video Coding (AVC) Backward-Compatible Bit-Depth Scalable Coding" IEEE Transactions on Circuits and Systems for Video Technology, vol. 19, Issue 4, Mar. 4, 2009, pp. 500-510.

Ye, Y. et al "The Scalable Extensions of HEVC for Ultra-High Definition Video Delivery" IEEE Multimedia, vol. 21, Issue 3, Jul. 22, 2014, pp. 58-64.

Winken, M. et al "Bit-Depth Scalable Video Coding" IEEE International Conference on Image Processing, Sep. 16-Oct. 19, 2007, pp. I-5-I-8.

ITU-R BT. 2073-1, "Use of the High Efficiency Video Coding (HEVC) Standard for UHDTV and HDTV Broadcasting" Feb. 2015.

SMPTE Standard "Dynamic Metadata for Color Volume Transform—Application #1" SMPTE ST 2094-10:2016, May 18, 2016, pp. 1-15.

* cited by examiner

BACKWARD-COMPATIBLE HDR CODECS WITH TEMPORAL SCALABILITY

CROSS-REFERENCE TO RELATED APPLICATIONS

This application claims the benefit of priority to U.S. Provisional Patent Application 62/319,424, filed on Apr. 7, 2016, which is hereby incorporated by reference in its entirety.

TECHNOLOGY

The present invention relates generally to images. More particularly, an embodiment of the present invention relates to backward-compatible HDR codecs with temporal scalability.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

Most consumer desktop displays currently support luminance of 200 to 300 cd/m² or nits. Most consumer HDTVs range from 300 to 500 nits with new models reaching 1000 nits (cd/m²). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more).

Recent advances in video coding technology (e.g., Rec. ITU-T H.265, also known as HEVC) allow for the efficient coding and transmissions of pictures with even higher resolution than high-definition TV (HDTV). For example, as indicated in Rec. ITU-R BT. 2073-1 (02/2015), "*Use of the high efficiency video coding (HEVC) standard for UHDTV and HDTV broadcasting*," which is incorporated herein by reference in its entirety, it is expected that future television standards may need to support frame resolutions as high as 7,680×4,320 pixels, at a variety of frames rates, including 50, 60, 100, and 120 Hz. As appreciated by the inventors here, improved techniques for backward-compatible coding and transmission of HD or UHD TV pictures at high dynamic range, with both temporal and dynamic range scalability are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Techniques for coding high dynamic range (HDR) images with temporal and dynamic-range scalability are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to coding high dynamic range (HDR) images with temporal and dynamic-range scalability. In an embodiment, a processor receives first and second high-dynamic range (HDR) images and first and second standard dynamic range (SDR) images corresponding to the first and second HDR images. The first SDR image is encoded with an encoder to generate a first coded image. The second SDR image is down-sampled to generate a down-sampled SDR image. A first predicted HDR image is generated based on the first coded image. A second predicted HDR image is generated a based on the down-sampled SDR image. A first residual image is generated based on the first predicted HDR image and the first HDR image. A second residual image is generated based on the second predicted HDR image and the second HDR image. A packed image is generated based on the first residual image, the second residual image, and the down-sampled SDR image. The packed image is encoded with an encoder to generate a second coded image, and the first coded image and the second coded image are multiplexed to generate an output coded image.

In another embodiment, a decoder receives a coded bitstream comprising a coded base layer and a coded enhancement layer, wherein the coded enhancement layer comprises a coded packed frame comprising a first down-sampled HDR residual image, a second down-sampled HDR residual image, and a down-sampled image frame. The coded base layer is decoded to generate a first SDR image, and the coded enhancement layer is decoded to generate based on the coded packed frame a second SDR image, and/or a first HDR image, and/or a second HDR image.

In another embodiment, an encoder receives first and second high-dynamic range (HDR) images and first and second standard dynamic range (SDR) images corresponding to the first and second HDR images. The first SDR image and the second SDR image are encoded with a scalable SDR encoder to generate a scalable SDR bitstream comprising a coded base layer (BL) SDR stream and a coded enhancement layer (EL) SDR stream. A first predicted HDR image and a second predicted HDR image are generated based on the SDR bitstreams. A first residual image is generated based on the first predicted HDR image and the first HDR image. A second residual image is generated based on the second predicted HDR image and the second HDR image. The first residual image and the second residual image are encoded with a scalable residual encoder to generate a coded scalable residual bitstream comprising a coded residual base layer (RBL) and a coded residual enhancement layer (REL), and the scalable SDR bitstream and the scalable residual bitstream are multiplexed to generate an output bitstream.

In another embodiment, a decoder receives a coded bitstream comprising a coded temporally-scalable SDR stream, a coded temporally-scalable HDR residual stream, and a metadata stream. The coded temporally-scalable SDR stream is decoded to generate a first SDR video signal in a half frame rate and a second SDR video signal in a half frame rate. The first SDR video signal and the second SDR video signal are combined to generate an output SDR video signal at full frame rate.

Furthermore, in some embodiments, the coded temporally-scalable HDR residual stream is decoded to generate a first HDR residual signal and a second HDR residual signal. A first predicted HDR signal is generated based on the first SDR video signal. A second predicted HDR signal is generated based on the second SDR video signal. A first half-frame rate HDR signal is generated based on the first predicted HDR signal and the first HDR residual signal. A second half-frame rate HDR signal is generated based on the second predicted HDR signal and the second HDR residual signal, and the first HDR video signal and the second HDR video signal are combined to generate an output HDR video signal at a full frame rate.

Example Video Delivery Processing Pipeline

Existing display and play-back devices, such as HDTVs, set-top boxes, or Blu-ray players, typically support signals of up to 1080p HD resolution (e.g., 1920×1080 at 50 or 60 frames per second). For consumer applications, such signals are now typically compressed using a bit-depth of 8 bits per pixel per color component in a luma-chroma color format where typically the chroma components have a lower resolution than then luma component (e.g., the YCbCr or YUV 4:2:0 color format). Because of the 8-bit depth and the corresponding low dynamic range, such signals are typically referred to as signals with standard dynamic range (SDR).

As new television standards are being developed, such as Ultra High Definition (UHD), it may be desirable to encode signals with enhanced resolution and/or enhanced dynamic range in a format that both legacy HDTV decoders and newer UHD decoders can process.

Figure 1:
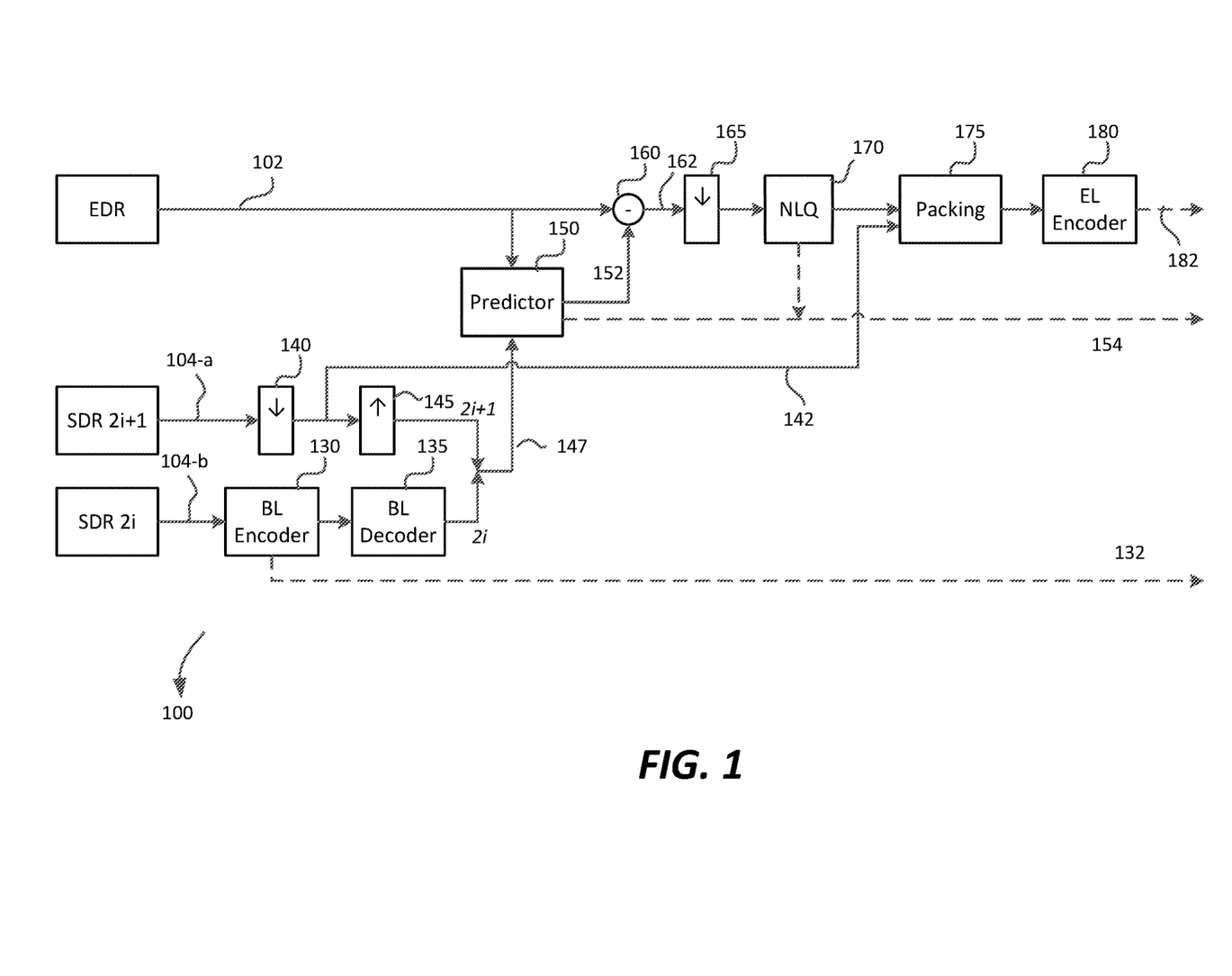
FIG. 1 depicts an example encoding process with enhancement layer frame packing according to an embodiment of the present invention.

FIG. 1 depicts an embodiment of an example implementation of a system supporting backward-compatible coding of HD or UHD signals with enhanced dynamic range (EDR) and temporal scalability. The encoder comprises a base layer (BL) Encoder (130), a BL Decoder (135), and an enhancement layer (EL) encoder (180). In one embodiment, BL Encoder (130) may be a legacy encoder, such as an MPEG-2 or H.264 encoder, and EL Encoder 160 may be a new standard encoder, such as an HEVC encoder. In another embodiment, both the BL and EL encoders may be HEVC encoders or any other video encoders known in the art (e.g., VP8, VP9, and the like). To support legacy BL decoders, BL encoder 130 is typically an 8-bit encoder; however, EL encoder 180 may support input streams with a higher bit depth, such as 10 bits, as specified by the H.264 and HEVC standards. However, this system is applicable to any combination of either known or future encoders, whether they are standard-based or proprietary.

As depicted in FIG. 1, an input signal, such as a movie or television broadcast, may be represented by two signals: an EDR input (102) and an SDR input (104). For example, the EDR signal (102) may be a 4K (e.g., 3,840×2,160) resolution signal or an 8K (e.g., 7,680×4,320) signal captured by an HDR camera and color-graded for an EDR display. The same signal may also be color-graded on an SDR display to generate a corresponding SDR signal 104. Alternatively, the SDR signal (104) may be generated by applying to the EDR signal any of known in the art tone-mapping or display management techniques.

In an embodiment, EDR signal (102) may be captured at a high frame rate (e.g., 100 or 120 Hz). To enable temporal scalability, without limitation, the corresponding high-frame-rate SDR signal (104) may be separated into two signals: SDR 2i+1 (104-*a*) and SDR 2i (104-*b*) comprising the odd and even frames of the high frame rate. Each of the SDR 2i+1 and SDR 2i signals are sampled at a legacy frame rate (e.g., 50 or 60 Hz).

In an embodiment, the spatial resolution of one of the temporally-sampled SDR signals (e.g., SDR 2i+1 (104-*a*)) may be down-sampled by down-sampler (140) (e.g., by a factor of two in either the horizontal or vertical dimension)

to generate signal 142. As will be discussed later, such a down sampling, allows for the efficient packing of SDR 2i+1 frames in the enhancement layer.

The other half of the temporally-sampled SDR signal (e.g., SDR 2i (104-*b*)) represents a backward-compatible signal representation of the original EDR signal (102). Signal 104-*b* may be encoded by BL encoder 130 to generate a backward-compatible coded bitstream (132). BL encoder (130) may compress or encode SDR 2i signal (104-*b*) using any of the known or future video compression algorithms, such as MPEG-2, MPEG-4, part 2, H.264, HEVC, VP8, and the like.

Following down-sampling (140) and BL encoding (130), the two SDR signals are respectively either up-sampled by up-sampling (145) or decoded (by BL decoder 135) to represent the SDR signals 2i and 2i+1 as they will be decoded by a corresponding BL decoder (e.g. (200)). A switch feeds to predictor (150) signal 147, which represents either the output of up-sampler (145) or the output of BL decoder (135).

Predictor (150) estimates the original EDR signal (102) using input (147). In an embodiment, the predictor coefficients may be determined by any known in the art minimization-error techniques, such as minimizing the mean-square-error (e.g., $\|s_i - \hat{s}_i\|^2$) between the predicted value ($\hat{s}_i$) and the pixel values in the reference HD EDR signal ($s_i$) (102). Predictor (150) may be a polynomial predictor or a multiple-color channel, multiple-regression (MMR) predictor, as the ones described by G-M Su et al in U.S. Pat. No. 8,811,490, "Multiple color channel multiple regression predictor," which is incorporated herein by reference in its entirety. The prediction model and the corresponding prediction coefficients may be communicated from the encoder (100) to a decoder using a variety of methods, such as embedding their values in the bitstream as auxiliary data or metadata (154).

Given the output of the predictor (152), signals 102 and 152 are subtracted (160) to generate the EL residual signal (162). In an embodiment, residual signal 162 is down-sampled down-sampler (165) and then processed by non-linear quantizer (NLQ) (170). As will be discussed later, the amount of down-sampling in down-sampler (165) depends on the spatial resolution of the BL and EL frames and the packing arrangement to be performed in packing (175). An example of NLQ (170) is presented in PCT patent Application Ser. No. PCT/US2013/073085 (published as WO 2014/107255), filed on Dec. 4, 2013, and titled "Backward-compatible coding for ultra-high definition video signals with enhanced dynamic range," which is incorporated herein by reference in its entirety. The output of the NLQ (170) is packed with the output of down-sampler (140) by packing (175) and then compressed using the EL encoder 180 to generate a coded EL bitstream 182 which may be transmitted to suitable decoders.

EL encoder (180) may be any suitable encoder, such as those described by the MPEG-2, MPEG-4, H.264, HEVC specifications and the like. In an embodiment, BL coded bitstream (132), EL coded bitstream (182), and metadata related to the coding process (e.g., the predictor parameters or look-up tables) may be multiplexed into a single bit stream (not shown).

In some embodiments, the EDR signal (102) may be available in lower or higher precision than 16-bit; however, its precision is expected to be higher than 8 bits (e.g., 10 bits or 12 bits).

In an embodiment, without loss of generality, the EDR (102) and SDR (104) inputs may have the same spatial resolution. In other embodiments, the EDR signal (102) may have a higher resolution than the SDR input (104). In such a case, an additional upscaler (not shown) may need to be inserted at the output of predictor (152) so that the resolution of the predicted EDR output matches the spatial resolution of the EDR input (102).

Sub-frame Packing in the Enhancement Layer

As discussed earlier, packing block (175) operates at the highest possible frame rate and receives the following signals:

Residual 2i—when the input to the predictor is SDR 2i
Residual 2i+1—when the input to the predictor is SDR 2i+1
SDR 2i+1

Figure 3A:
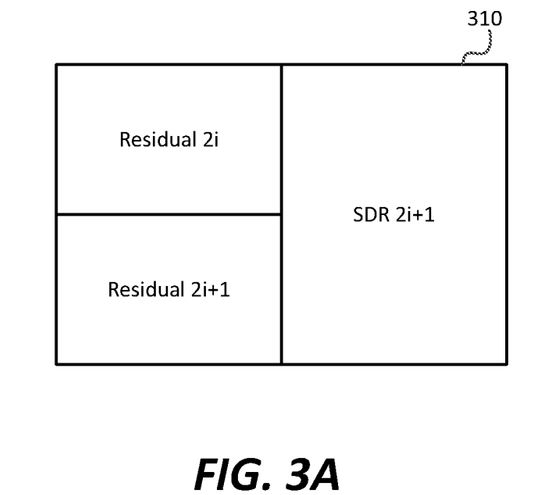
FIG. 3A depicts an example top-bottom packing format for residuals according to an embodiment of the present invention.
Figure 3B:
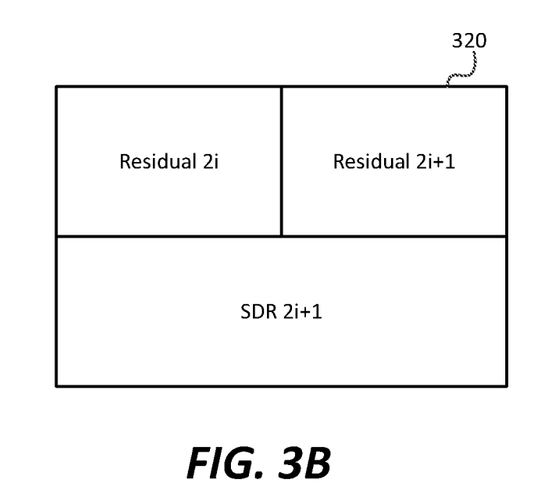
FIG. 3B depicts an example side-by-side packing format for residuals according to an embodiment of the present invention.

FIG. 3A and FIG. 3B depict two examples for packing these three signals, depending on how the SDR 2i+1 signal is down-sampled. For example, as depicted in FIG. 3A, if SDR 2i+1 is sampled horizontally (e.g., by a factor of two), then the two residual signals (e.g., down-sampled by a factor of two in both directions) can be packed in a top-bottom configuration. Alternatively, as depicted in FIG. 3B, if SDR 2i+1 is sampled vertically, then the two residual signals (down-sampled by a factor of two in both directions) can be packed in a side-by-side configuration. A person skilled in the art would appreciate that alternative packing arrangements are possible, depending on the resolution of the EDR and SDR inputs and the down-sampling strategies for the residual and the SDR signals. It is expected that bitstream metadata will convey to a decoder the exact position and resolution of the different sub-frames within the EL bitstream.

Decoding

Figure 2:
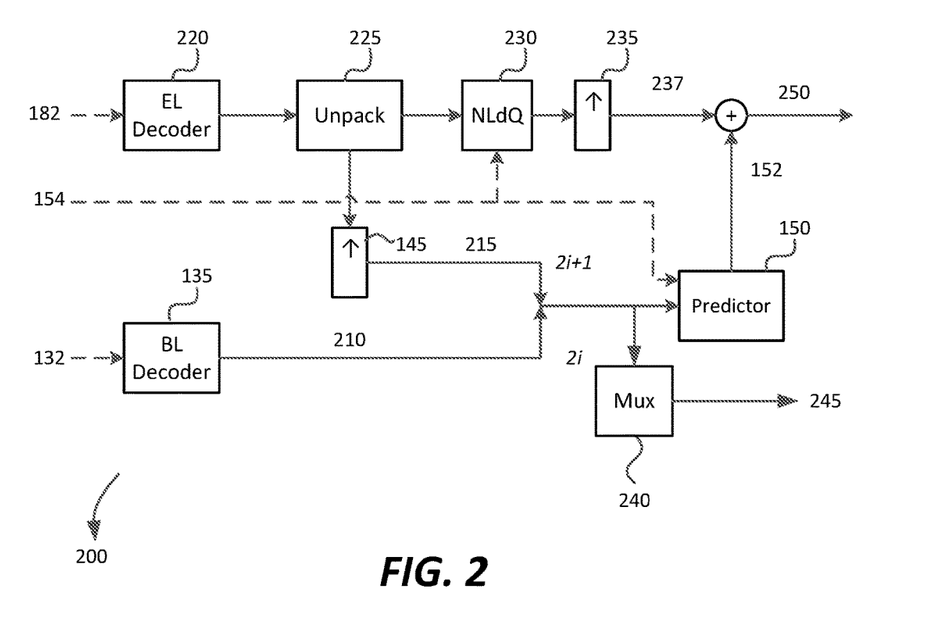
FIG. 2 depicts an example decoding process for enhancement layer packed data according to an embodiment of this invention.

FIG. 2 depicts an embodiment of an example implementation of a system supporting backward-compatible decoding of HD or UHD signals with enhanced dynamic range (EDR) and temporal scalability. In response to a coded signal transmitted by an encoder (e.g., 100), decoder (200) receives and demultiplexes a coded bitstream that comprises at least two coded sub-streams: a coded BL stream 132 and a coded EL stream 182.

Coded BL stream 132 comprises an SDR signal (210) at a legacy frame rate (e.g., 50 Hz or 60 Hz) which can be decoded using BL decoder 135. In an embodiment, BL Decoder (135) matches BL Encoder (130). For example, for backward compatibility with existing broadcast and Blu-ray standards, BL decoder 135 may comply with one or more of the MPEG-2 or H.264 coding specifications. Receivers with enhanced frame rate and/or EDR display capabilities may combine information from both the BL and EL bit streams (132 and 182) to generate a signal with enhanced dynamic range (e.g., 232) and/or frame rate as depicted in FIG. 2.

To generate a high frame-rate SDR signal (e.g., 100 or 120 Hz), a decoder may decode the EL stream (182), extract the SDR 2i+1 signal, upscale it by upscaler (145), and then multiplex (240) the SDR 2i and SDR 2i+1 signals to generate a high frame rate SDR signal 245. Up-scaler (145) performs the inverse of down-scaler (140) in the encoder (100).

The decoder (200) may also generate a temporally-scaled EDR signal 250. The two residual signals in the EL stream (182) are unpacked, processed by the inverse non-linear quantizer (230), and then spatially up-sampled by up-sampler (235). Up-sampler (235) corresponds to down-sampler (165). That is, if a residual image is down-sampled by a factor of two in both dimensions in the encoder, the decoded residual will be up-sampled by a factor of two in both dimensions in the decoder.

Given the prediction model and corresponding prediction parameters by the bitstream metadata (154), predictor (150) generates prediction data 152 which are added to the residual signal (237) to generate the final bitstream (250). Hence, decoder (200) may generate any of the following bit streams:

A backward-compatible (or half frame rate) SDR stream;
A full-frame rate SDR stream
A half-frame-rate EDR stream; and
A full-frame rate EDR stream To improve the efficiency of decoding the EL stream, in an embodiment, the three packed image frames (e.g., 310 or 320) in the EL stream may be encoded so that each one can be decoded independently of each other. For example, HEVC supports tiling, where image regions of a frame can be coded independently of each other as "tiles." For example, when the EL stream is coded as three tiles, a full-frame-rate SDR decoder may choose to simply decode the SDR 2i+1 tile and ignore the Residual tiles. Similarly, a half-frame-rate (e.g. 50/60 Hz) EDR decoder, may choose to decode only the Residual 2i tile and bypass decoding all other tiles.

Four-layer Architecture

Figure 4:
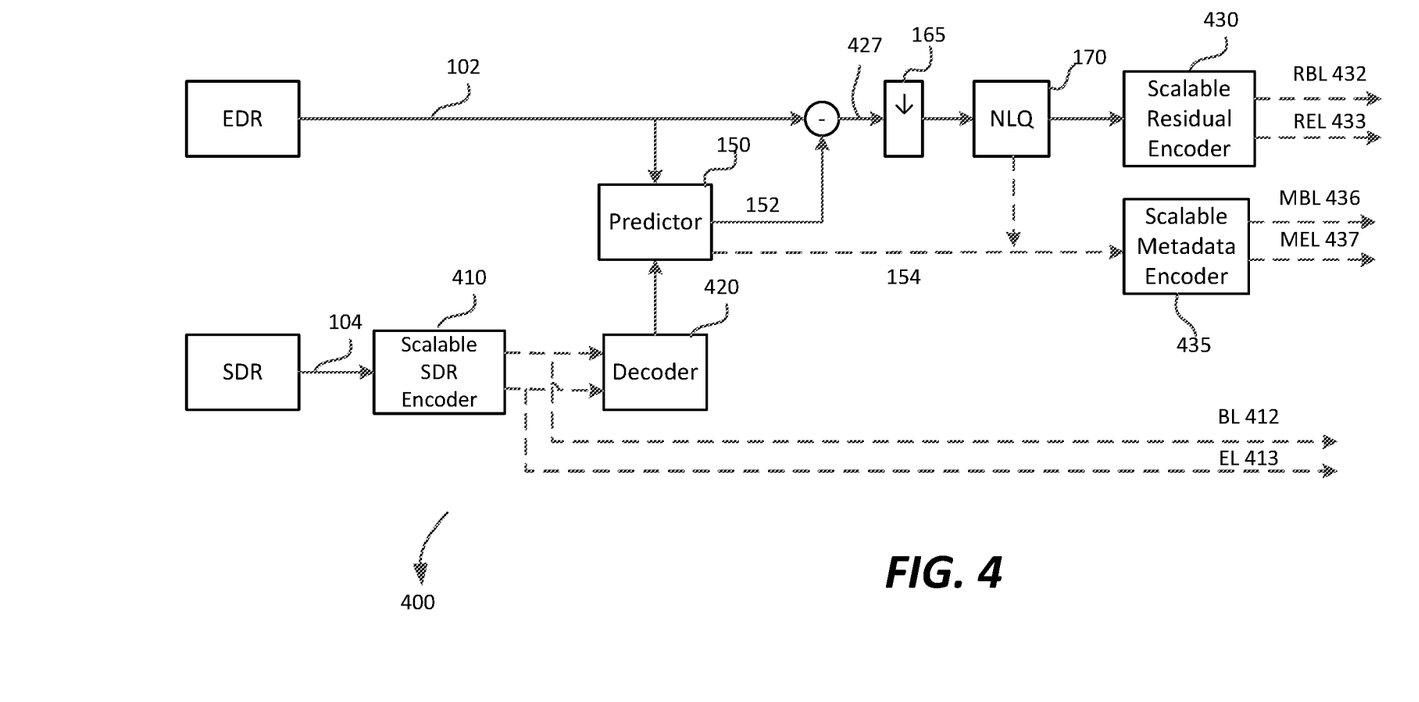
FIG. 4 depicts an example of a four-layer architecture that supports both temporal and dynamic range scalability according to an embodiment of this invention.

FIG. 4 depicts an example of a four-layer architecture that supports both temporal and dynamic range scalability according to an embodiment. The architecture is very similar to the dual-layer architecture for coding EDR signals (e.g., system (100), but without the SDR 2i+1 path that includes down-sampler (140) and up-sampler (145)), except that that SDR Encoder (410) and Residual Encoder (430) are now scalable (e.g., dual-layer) encoders, such as those supported by the H.264 (AVC) and H.265 (HEVC) specifications. For example, in an embodiment, in a Scalable SDR Encoder (410), encoding may performed as follows:

A base layer encoder within Scalable SDR Encoder encodes every other frame of the SDR (104) input (e.g., the SDR 2i stream (104-*b*)) to generate BL 412, which is suitable to be decoded by all legacy decoders An enhancement layer (EL) encoder within encoder (410) generates a first EL stream (413) by coding the remaining frames of SDR input (104) (e.g., the SDR 2i+1 stream (104-*a*)) using reference frames from both the base layer and the enhancement layer. Such inter-layer prediction should yield a far more efficient coding of the EL input that coding the EL input alone Following decoding (420) and prediction (150), as in system (100), a high-frame residual stream (427) is generated. Unlike system (100), down sampling (165) is now optional and may be bypassed. Following the non-linear quantizer (170), the quantized residual stream is again coded by a scalable Residual Encoder (430). Similarly to the scalable SDR encoder, scalable Residual encoder may generate a residual base layer (RBL 432) comprising residuals based on the BL stream 412, which can be decoded on its own, and a residual EL stream (REL) (433), which comprises residuals based on the EL stream (413) and can be decoded with reference to RBL (432).

In an embodiment, to reduce the amount of metadata (154) that need to be embedded, metadata for the EL/REL pair of streams may be coded with reference to the metadata in the BL/RBL streams using a scalable metadata encoder (435), which generates metadata streams MBL and MEL.

Compared to system (100), system (400) has the following differences:

Requires four bitstream layers instead of two
Preserves the full resolution of all the SDR frames
Does not require any packing At the system level, system (400) will generate six bit streams. In an embodiment, without limitation, one may use two MPEG transport stream Packet Identifiers (PIDs) to include the BL and EL streams; and two Network Abstraction Layer (NAL) units in each PID to carry different bit streams. Depending on the priority of scalability, the following two methods may be applied at the system level.

A. Dynamic Range Scalability is More Important than Temporal Scalability

The first PID contains three bit streams for base layer for SDR 2i using 3 NAL units
  NAL 1: SDR BL bitstream for SDR 2i (BL 412)
  NAL 2: Residual BL bitstream for SDR 2i (RBL 432)
  NAL 3: Metadata BL bitstream for SDR 2i (MBL 436)
The second PID contains three bit streams for enhancement layer for SDR 2i+1 using three NAL units
  NAL 1: SDR EL bitstream for SDR 2i+1 (EL 413)
  NAL 2: Residual EL bitstream for SDR 2i+1 (REL 433)
  NAL 3: Metadata EL bitstream for SDR 2i+1 (MEL 437)
The first PID has complete information to support the dynamic range scalability for SDR 2i. Having both PIDs, a decoder can support additional temporal scalability for SDR 2i+1.

B. Temporal Scalability is More Important than Dynamic Range Scalability

The first PID contains two bit streams for both SDR 2i and SDR 2i+1 using two NAL units
  NAL 1: SDR BL bitstream for SDR 2i (BL 412)
  NAL 2: SDR EL bitstream for SDR 2i+1 (EL 413)
The second PID contains four bit streams for enhancement layer for frame 2i+1 using four NAL units
  NAL 1: residual BL bitstream for SDR 2i (RBL 432)
  NAL 2: metadata BL bitstream for SDR 2i (MBL 436)
  NAL 3: residual EL bitstream for SDR 2i+1 (REL 433)
  NAL 4: metadata EL bitstream for SDR 2i+1 (MEL 437)
The first PID has complete information to support temporal scalability for SDR. Having both PID, a decoder can support additional dynamic range scalability in full frame rate.

Figure 5:
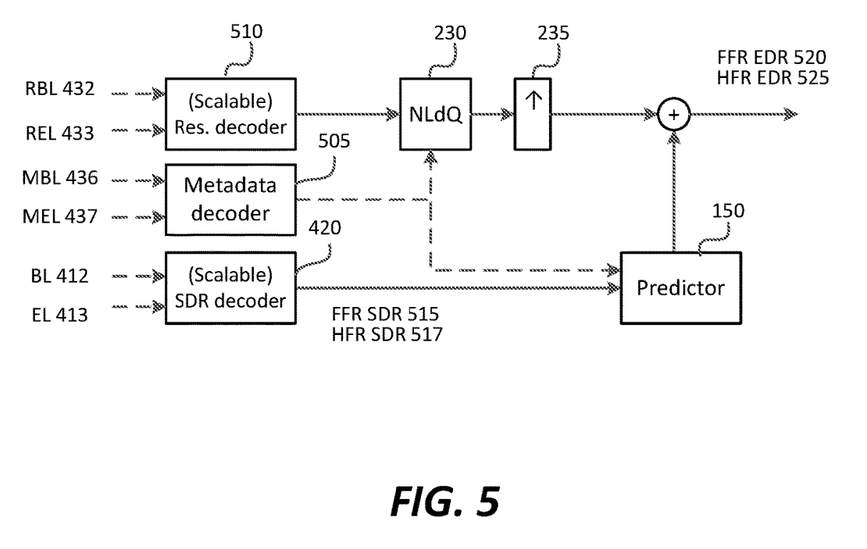
FIG. 5 depicts an example of a scalable decoder for decoding a four-layer bitstream that supports both temporal and dynamic range scalability according to an embodiment of this invention.

FIG. 5 depicts an example of an architecture to decode up to four layers of bit stream data and associated metadata, supporting both temporal and dynamic range scalability. Legacy SDR decoders can decode only BL 412 using an SDR decoder (420) to generate a legacy SDR bit stream (HFR SDR 517) (e.g., SDR at 50/60 Hz). Full-frame-rate (FFR) SDR decoders, can use a scalable SDR decoder (420) to decode both BL 412 and EL 413 to generate a full frame rate SDR signal (FFR SDR 515) (e.g., SDR at 100/120 Hz). Legacy EDR decoders can combine the base layer (BL 412) and a residual layer (RBL 432) to generate (according to metadata MBL 436) a half frame rate (HFR) EDR signal (HFR EDR 525) (e.g., EDR at 50/60 Hz). Finally, a full-frame rate EDR decoder can use all available data to generate a full frame-rate EDR signal (FFR EDR 520).

SEI Messaging for Metadata

In an embodiment, metadata (154) may be transmitted from an encoder to a decoder using Supplemental Enhancement Information (SEI) messaging, for example, as supported by the H.264 and H.265 specifications. Given the structure of user-based SEI messaging in Table 1, Table 2 provides an example of user identifiers for either a composer (Composer_data( )) or display management (DM_data( )). As used herein, the term "composer" denotes the functionality in a decoder to combine a base layer SDR stream (e.g., 132) with an enhancement layer residual (e.g., 182), to generate an output HDR signal (250). As used herein, the terms "display management" or "display mapping" denote the processing (e.g., tone and gamut mapping) required to map an input video signal of a first dynamic range (e.g., 1000 nits) to a display of a second dynamic range (e.g., 500 nits). Examples of display management processes can be found in WIPO Publication Ser. No. WO 2014/130343, "Display Management for High Dynamic Range Video," which is incorporated herein by reference in its entirety.

TABLE 1

| Compound content management SEI messaging | Descriptor |
|---|---|
| user_data_registered_itu_t_t35( payloadSize ) { | |
|     itu_t_t35_country_code | b(8) |
|     if( itu_t_t35_country_code != 0xFF ) | |
|         i = 1 | |
|     else { | |
|         itu_t_t35_country_code_extension_byte | b(8) |
|         i = 2 | |
|     } | |
|     itu_t_t35_provider_code | b(8) |
|     user_identifier | u(16) |
|     user_structure( ) | u(32) |
| } | |

TABLE 2

| user_identifier | |
|---|---|
| user_identifier | user_structure( ) |
| 1000 | Composer_data( ) |
| 1001 | DM_data( ) | itu_t_t35_country_code shall be a byte having a value specified as a country code by Rec. ITU-T T.35 Annex A. The value shall be 0xB5 (United States of America) for Compound Content Management SEI message.

itu_t_t35_country_code_extension_byte shall be a byte having a value specified as a country code by Rec. ITU-T T.35 Annex B.

itu_t_t35_provider_code shall be a fixed 16-bit field registered by Dolby. The value is to be determined.

user_identifier indicates the contents of the user structure( ) as defined in Table 2.

Table 3 depicts the syntax of Composer_data according to an embodiment.

TABLE 3

| Composer data SEI Messaging | Descriptor |
|---|---|
| Composer_data( ) { | |
|   ccm_profile | u(4) |
|   ccm_level | u(4) |
|   coefficient_log2_denom | ue(v) |
|   BL_bit_depth_minus8 | ue(v) |
|   EL_bit_depth_minus8 | ue(v) |
|   hdr_bit_depth_minus8 | ue(v) |
|   disable_residual_flag | u(1) |
|   for( cmp = 0; cmp < 3; cmp++ ) { | |
|     num_pivots_minus2[ cmp ] | ue(v) |
|     for ( pivot_idx = 0; pivot_idx < num_pivots_minus2[ cmp ] + 2; pivot_idx + + ) { | |
|       pred_pivot_value[ cmp ][ pivot_idx ] | u(v) |
|     } // end of pivot points for BL three components | |
|   } //cmp | |
|   num_x_partitions_minus1 | ue(v) |
|   num_y_partitions_minus1 | ue(v) |
|   for ( cmp = 0; cmp < 3; cmp++ ) { //mapping parameters | |
|     for ( pivot_idx = 0; pivot_idx < num_pivots_minus2[ cmp ] + 1; pivot_idx++ ) { | |
|       mapping_idc[ cmp ][ pivot_idx ] | ue(v) |
|       if( mapping_idc [ cmp ][ pivot_idx ] == MAPPING_POLYNOMIAL ) { | |
|         poly_order_minus1[ cmp ][ pivot_idx ] | ue(v) |
|         if ( poly_order_minus1[ cmp ] [ pivot_idx ] == 0 ) | |
|           linear_interp_flag[ cmp ][ pivot_idx ] | u(1) |
|         for( i = 0 ; i <= poly_order_minus1[ cmp ][ pivot_idx ] + 1; i ++ ) { | |
|           poly_coef_int[ cmp ][ pivot_idx ][ i ] | se(v) |
|           poly_coef[ cmp ][ pivot_idx ][ i ] | u(v) |
|         } | |
|       else if( mapping_idc [ cmp ][ pivot_idx ] == MAPPING_MMR ) { | |
|         mmr_order_minus1[ cmp ][ pivot_idx ] | u(2) |
|         mmr_constant_int[ cmp ][ pivot_idx ] | se(v) |
|         mmr_constant[ cmp ][ pivot_idx ] | u(v) |
|         for( i = 1; i <= mmr_order_minus1 + 1; i ++ ) { | |
|           for (j = 0; j < 7; j++) { | |
|             mmr_coef_int[ cmp ][ pivot_idx ][ i ] [ j ] | se(v) |
|             mmr_coef [ cmp ][ pivot_idx ][ i ][ j ] | u(v) |
|           } // the j-th coefficients | |
|         } // the i-th order | |
|       } // MMR coefficients | |
|     } // pivot_idx | |
|   } // cmp | |
|   if ( !disable_residual_flag ) { | |
|     for ( cmp = 0; cmp < 3; cmp++ ) { //quantization parameters | |
|       nlq_offset[ cmp ] | u(v) |
|       hdr_in_max_int[ cmp ] | ue(v) |
|       hdr_in_max[ cmp ] | u(v) |
|       linear_deadzone_slope_int[ cmp ] | ue(v) |

TABLE 3-continued

Composer data SEI Messaging

| | Descriptor |
|---|---|
|         linear_deadzone_slope[ cmp ] | u(v) |
|         linear_deadzone_threshold_int[ cmp ] | ue(v) |
|         linear_deadzone_threshold[ cmp ] | u(v) |
|       } // cmp | |
|     } // disable_residue_flag | |
|     while( !byte_aligned( ) ) | |
|         cm_alignment_zero_bit | f(1) |
| } | |

In an embodiment, the user data SEI message may be required to be byte-aligned. In an embodiment cm_alignment_zero_bit=0. Table 4 depicts the syntax for DM_data according to an embodiment. In another embodiment, metadata may be defined as in SMPTE ST-2094-10, "Dynamic Metadata for Color Volume Transform—Application #1," which is incorporated herein by reference in its entirety.

TABLE 4

SEI Messaging for DM_data

| | Descriptor |
|---|---|
| DM_data( ) { | |
|     affected_dm_metadata_id | u(4) |
|     current_dm_metadata_id | u(4) |
|     scene_refresh_flag | u(8) |
|     YCCtoRGB_coef0_hi | u(8) |
|     YCCtoRGB_coef0_lo | u(8) |
|     YCCtoRGB_coef1_hi | u(8) |
|     YCCtoRGB_coef1_lo | u(8) |
|     YCCtoRGB_coef2_hi | u(8) |
|     YCCtoRGB_coef2_lo | u(8) |
|     YCCtoRGB_coef3_hi | u(8) |
|     YCCtoRGB_coef3_lo | u(8) |
|     YCCtoRGB_coef4_hi | u(8) |
|     YCCtoRGB_coef4_lo | u(8) |
|     YCCtoRGB_coef5_hi | u(8) |
|     YCCtoRGB_coef5_lo | u(8) |
|     YCCtoRGB_coef6_hi | u(8) |
|     YCCtoRGB_coef6_lo | u(8) |
|     YCCtoRGB_coef7_hi | u(8) |
|     YCCtoRGB_coef7_lo | u(8) |
|     YCCtoRGB_coef8_hi | u(8) |
|     YCCtoRGB_coef8_lo | u(8) |
|     YCCtoRGB_offset0_byte3 | u(8) |
|     YCCtoRGB_offset0_byte2 | u(8) |
|     YCCtoRGB_offset0_byte1 | u(8) |
|     YCCtoRGB_offset0_byte0 | u(8) |
|     YCCtoRGB_offset1_byte3 | u(8) |
|     YCCtoRGB_offset1_byte2 | u(8) |
|     YCCtoRGB_offset1_byte1 | u(8) |
|     YCCtoRGB_offset1_byte0 | u(8) |
|     YCCtoRGB_offset2_byte3 | u(8) |
|     YCCtoRGB_offset2_byte2 | u(8) |
|     YCCtoRGB_offset2_byte1 | u(8) |
|     YCCtoRGB_offset2_byte0 | u(8) |
|     RGBtoLMS_coef0_hi | u(8) |
|     RGBtoLMS_coef0_lo | u(8) |
|     RGBtoLMS_coef1_hi | u(8) |
|     RGBtoLMS_coef1_lo | u(8) |
|     RGBtoLMS_coef2_hi | u(8) |
|     RGBtoLMS_coef2_lo | u(8) |
|     RGBtoLMS_coef3_hi | u(8) |
|     RGBtoLMS_coef3_lo | u(8) |
|     RGBtoLMS_coef4_hi | u(8) |
|     RGBtoLMS_coef4_lo | u(8) |
|     RGBtoLMS_coef5_hi | u(8) |
|     RGBtoLMS_coef5_lo | u(8) |
|     RGBtoLMS_coef6_hi | u(8) |
|     RGBtoLMS_coef6_lo | u(8) |
|     RGBtoLMS_coef7_hi | u(8) |
|     RGBtoLMS_coef7_lo | u(8) |
|     RGBtoLMS_coef8_hi | u(8) |
|     RGBtoLMS_coef8_lo | u(8) |
|     signal_eotf_hi | u(8) |
|     signal_eotf_lo | u(8) |
|     signal_eotf_param0_hi | u(8) |
|     signal_eotf_param0_lo | u(8) |
|     signal_eotf_param1_hi | u(8) |
|     signal_eotf_param1_lo | u(8) |
|     signal_eotf_param2_byte3 | u(8) |
|     signal_eotf_param2_byte2 | u(8) |
|     signal_eotf_param2_byte1 | u(8) |
|     signal_eotf_param2_byte0 | u(8) |
|     signal_bit_depth | u(8) |
|     signal_color_space | u(8) |
|     signal_chroma_format | u(8) |
|     signal_full_range_flag | u(8) |
|     source_min_PQ_hi | u(8) |
|     source_min_PQ_lo | u(8) |
|     source_max_PQ_hi | u(8) |
|     source_max_PQ_lo | u(8) |
|     source_diagonal_hi | u(8) |
|     source_diagonal_lo | u(8) |
|     num_ext_blocks | u(8) |
|     if( num_ext_blocks > 0 ) { | |
|         for( i = 0; i < num_ext_blocks; i ++ ) { | |
|             ext_block_length_byte3 | u(8) |
|             ext_block_length_byte2 | u(8) |
|             ext_block_length_byte1 | u(8) |
|             ext_block_length_byte0 | u(8) |
|             ext_block_level | u(8) |
|             if( ext_block_level == 1 ) { | |
|                 min_PQ_hi | u(8) |
|                 min_PQ_lo | u(8) |
|                 max_PQ_hi | u(8) |
|                 max_PQ_lo | u(8) |
|                 avg_PQ_hi | u(8) |
|                 avg_PQ_lo | u(8) |
|             } | |
|             if( ext_block_level == 2 ) { | |
|                 target_max_PQ_hi | u(8) |
|                 target_max_PQ_lo | u(8) |
|                 trim_slope_hi | u(8) |
|                 trim_slope_lo | u(8) |
|                 trim_offset_hi | u(8) |
|                 trim_offset_lo | u(8) |
|                 trim_power_hi | u(8) |
|                 trim_power_lo | u(8) |
|                 trim_chroma_weight_hi | u(8) |
|                 trim_chroma_weight_lo | u(8) |
|                 trim_saturation_gain_hi | u(8) |
|                 trim_saturation_gain_lo | u(8) |
|                 ms_weight_hi | u(8) |
|                 ms_weight_lo | u(8) |
|             } | |
|             if( ext_block_level == 5 ) { | |
|                 active_area_left_offset_hi | u(8) |
|                 active_area_left_offset_lo | u(8) |

TABLE 4-continued

SEI Messaging for DM_data

| | Descriptor |
|---|---|
| active_area_right_offset_hi | u(8) |
| active_area_right_offset_lo | u(8) |
| active_area_top_offset_hi | u(8) |
| active_area_top_offset_lo | u(8) |
| active_area_bottom_offset_hi | u(8) |
| active_area_bottom_offset_lo | u(8) |
| } | |
| } // loop num_ext_blocks | |
| } // if (num_ext_blocks>0) | |
| } | |

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions related to backward-compatible coding and decoding supporting temporal and dynamic range scalability, such as those described herein. The computer and/or IC may compute any of a variety of parameters or values that relate to backward-compatible coding and decoding supporting temporal and dynamic range scalability as described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to backward-compatible coding and decoding as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to the efficient backward-compatible coding and decoding supporting temporal and dynamic range scalability are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for backward compatible encoding of HDR images, the method comprising:
receiving first and second high-dynamic range (HDR) images;
receiving first and second standard dynamic range (SDR) images corresponding to the first and second HDR images, wherein the first and second HDR images are two consecutive frames in a full-frame rate HDR video signal, and the first and second SDR images are two consecutive frames in a corresponding full-frame rate HDR video signal;
encoding the first SDR image with an encoder to generate a first coded image;
down-sampling the second SDR image to generate a down-sampled SDR image;
generating a first predicted HDR image based on the first coded image;
generating a second predicted HDR image based on the down-sampled SDR image;
generating a first residual image based on the first predicted HDR image and the first HDR image;
generating a second residual image based on the second predicted HDR image and the second HDR image;
generating a packed image based on the first residual image, the second residual image, and the down-sampled SDR image;
encoding the packed image with an encoder to generate a second coded image; and
multiplexing the first coded image and the second coded image to generate an output coded image.

2. The method of claim 1, wherein generating the packed image further comprises:
down-sampling the second SDR image by a factor of two in either the horizontal or vertical dimension;
down-sampling the first residual image by a factor of two in both the horizontal and the vertical dimensions to generate a first down-sampled residual image;
down-sampling the second residual image by a factor of two in both the horizontal and the vertical dimensions to generate a second down-sampled residual image; and
generating the packed image based on the down-sampled second SDR image, the first down-sampled residual image, and the second down-sampled residual image.

3. The method of claim 2, wherein if the second SDR image is down-sampled in the horizontal direction then the first and the second down-sampled residual images are packed in a top-bottom configuration.

4. The method of claim 2, wherein if the second SDR image is down-sampled in the vertical direction then the first and the second down-sampled residual images are packed in a side-by-side configuration.

5. The method of claim 2, wherein the encoding of the packed image comprises using tiles, wherein each of the down-sampled images in the packed image is encoded independently of the others.

6. The method of claim 1, wherein the output coded image further comprises metadata related to parameters used to generate the predicted HDR images.

7. A method of decoding with a decoder, the method comprising:
  receiving a coded bitstream comprising a coded temporally-scalable SDR stream, a coded temporally-scalable HDR residual stream, and a metadata stream;
  decoding the coded temporally-scalable SDR stream to generate a first SDR video signal in a half frame rate and a second SDR video signal in a half frame rate; and
  combining the first SDR video signal and the second SDR video signal to generate an output SDR video signal at full frame rate,
  decoding the coded temporally-scalable HDR residual stream to generate a first HDR residual signal and a second HDR residual signal;
  generating a first predicted HDR signal based on the first SDR video signal;
  generating a second predicted HDR signal based on the second SDR video signal;
  generating a first half-frame rate HDR signal based on the first predicted HDR signal and the first HDR residual signal; generating a second half-frame rate HDR signal based on the second predicted HDR signal and the second HDR residual signal; and
  combining the first HDR video signal and the second HDR video signal to generate an output HDR video signal at a full frame rate.

8. An apparatus comprising a processor and configured to perform the method recited in claim 1.

9. A non-transitory computer-readable storage medium having stored thereon computer-executable instruction for executing a method with one or more processors in accordance with claim 1.

* * * * *